Figure 1:
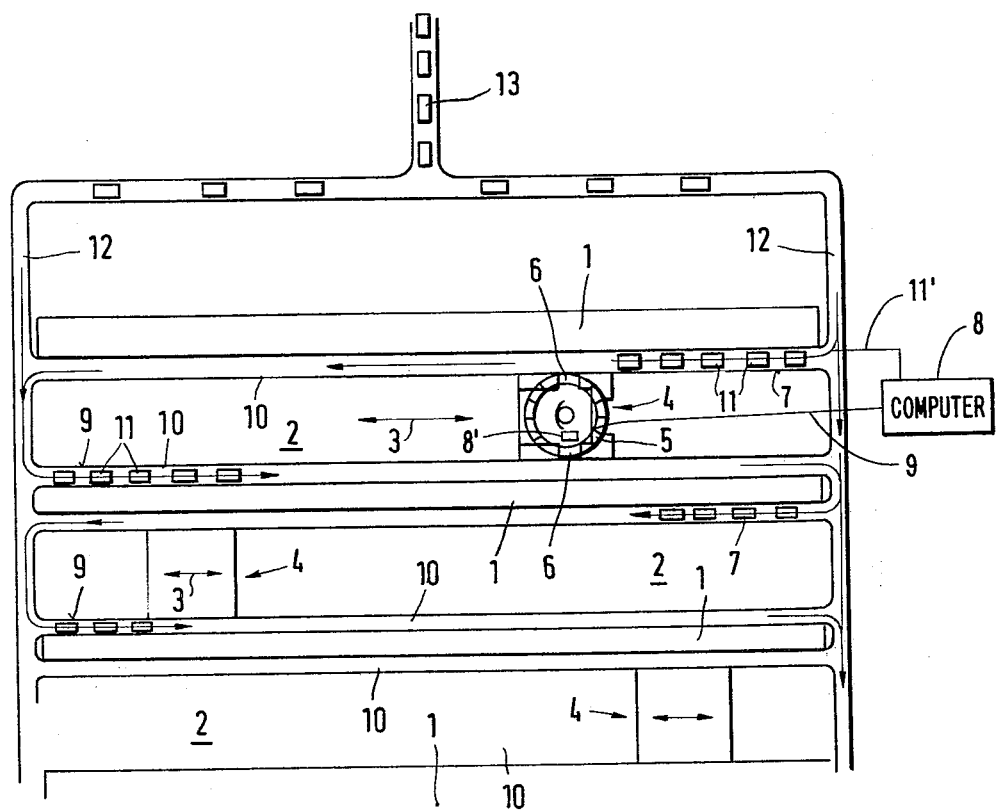

United States Patent [19]

Weber et al.

[11] 4,426,189

[45] Jan. 17, 1984

[54] METHOD FOR ASSEMBLING CONSIGNMENTS

[76] Inventors: Otto Weber, Kurpfalzstrasse 21, D-6945 Hirschberg; Klaus Ohnsmann, Leharstrasse 32, D-6940 Weinheim; Ferdinand Christ, Heidelbergerstrasse 7, D-6831 Brühl, all of Fed. Rep. of Germany

[21] Appl. No.: 301,315

[22] Filed: Sep. 11, 1981

[30] Foreign Application Priority Data

Sep. 26, 1980 [DE] Fed. Rep. of Germany ....... 3036293

[51] Int. Cl.³ .............................................. B65G 1/02
[52] U.S. Cl. ..................................... 414/786; 414/21; 414/267; 414/273
[58] Field of Search ............... 414/266, 267, 273, 285, 414/786

[56] References Cited

U.S. PATENT DOCUMENTS 3,528,566  9/1970  Weir ..................................... 414/285
3,927,773 12/1975  Bright ................................... 414/273

*Primary Examiner*—Robert G. Sheridan

[57] ABSTRACT

A method for assembling consignments of articles stored in storage containers in a high shelf by means of a consignment assembler, which collects during the course of one single or round trip along the high shelf all the articles of a plurality of orders from the high shelf. In addition, a consignment assembler is described, which is characterized by a plurality of collector buckets.

4 Claims, 3 Drawing Figures

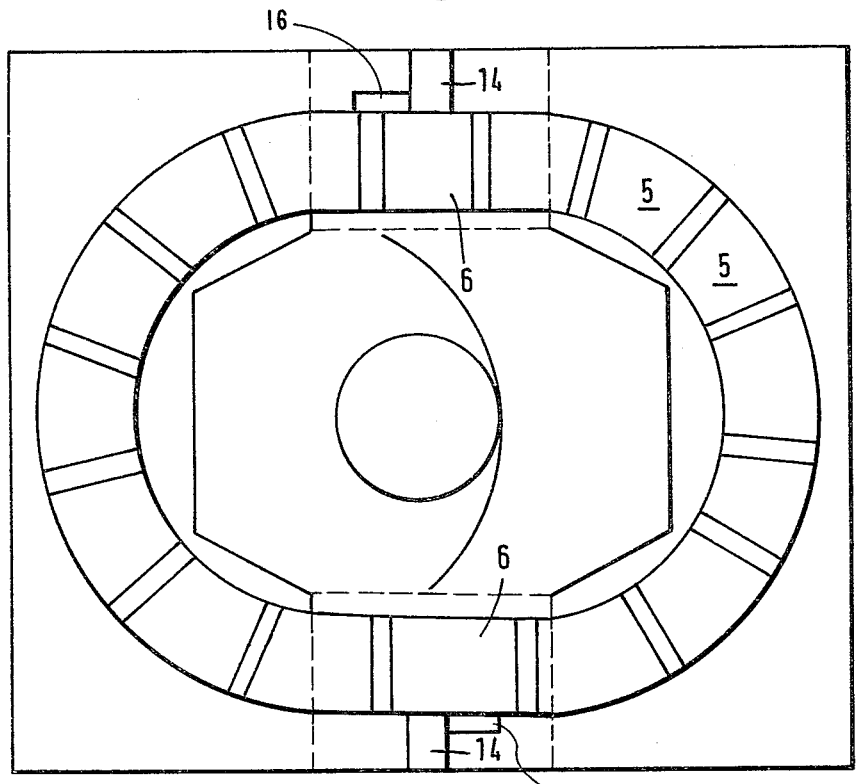
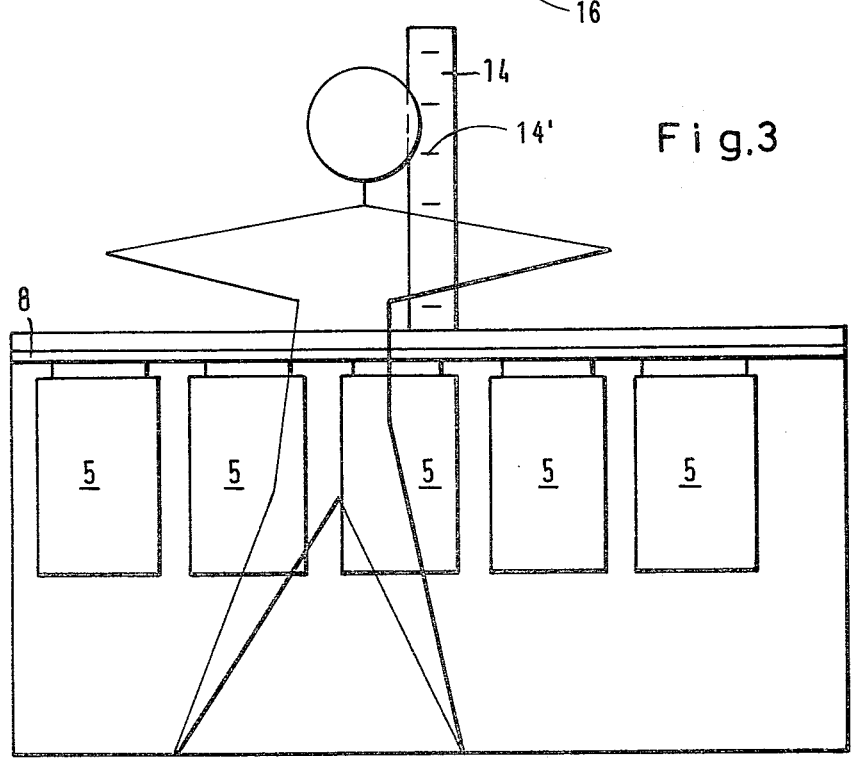

METHOD FOR ASSEMBLING CONSIGNMENTS

The present invention relates to a method for assembling consignments of articles stored in storage containers on a high shelf by means of a shelf consignment assembler movable in an aisle in front of the high shelf, the shelf consignment assembler including a working station the positioning of which in the aisle and the height positioning of the working station depending on the articles to be unloaded or picked is controlled by a computer provided with corresponding informations. Moreover, the invention relates to a consignment assembler for performing this method.

Warehousing and consignment assembling in a distribution center has been described in the journal "foerdern and heben" vol. 26, No. 10, pp. 1011–1015 (1976). For assembling the articles stored in high shelves, a shelf consignment assembler movable along the high shelf in an aisle is employed, which is controlled by hand and the working station of which is brought into the area of the article in question (in the length coordinate as well as in the height coordinate) where the desired quantity of the article in question is picked by hand. This distribution center includes moreover an intermediate store, in which the articles in question are stored on pallets, i.e. in large batches, on high shelves. This intermediate store is serviced by a shelf conveyor device, the working station of which is controlled by a computer. With a view to the complexity of the articles to be assembled, one did obviously not dare to employ a computer-controlled shelf consignment assembler for assembling the articles as well.

The journal "Mechanical Handling", October 1965, pp. 470–473, describes a method for assembling consignments, wherein a conveying device for each individual order is moved through the aisle in front of a high shelf. When the articles for this single order have been picked, the device is unloaded and moves emptily back to its original position. In this case it is not possible to pick articles for a plurality of orders on one single trip of the conveyor device so that this method proves to be costly and time consuming as well.

The present invention is based on the problem of providing a method for assembling consignments of articles stored in storage containers in a high shelf by means of a shelf consignment assembler, which is order-orientedly controlled as to its positioning in the aisle as well as to the height positioning of its working station, the method being so developed that a plurality of order-oriented consignments can be assembled during the course of one single trip of the device along the shelf.

Starting from a method of the kind mentioned in the beginning, the problem is solved in that during the course of one single or round trip the shelf consignment assembler picks from along the high shelf all the articles of a plurality of orders located on that high shelf while the control device of the assembler transfers, in addition to operating the aisle and height positioning of the working station of the assembler, order-orientedly, one of a plurality of collector buckets at a time to a loading position of the assembler, and the collector buckets order-orientedly filled with the articles from the high shelf are emptied, after the completion of the trip of the assembler through the aisle, into a corresponding number of consignment containers also to be filled order-orientedly.

The computer, which is fed with all the significant data concerning the consignments to be assembled, does not only control the position of the assembler in the aisle and the height position of the working station of the device, but, so to say as the third dimension, additionally also the position of the collector bucket of the assembler such that a collector bucket assigned to a certain order is always then in the loading position of the assembler if and when an article needed for this particular order is to be picked, in a certain quantity, from the high shelf. If the particular article has order-orientedly been transferred into the corresponding collector bucket, the computer now steers towards the following nearest article on this high shelf, which is part of the same or of a further order. Here, that collector bucket of the device is brought into the loading position, which is assigned to this order. Only if it is the same order as in the foregoing picking action, the same collector bucket is filled with a predetermined quantity of this article because, as mentioned before, the collector buckets are filled order-orientedly. During the course of one single trip along the high shelf, if necessary during the course of one single round trip along the high shelf, all the articles of all the orders are picked in the way described into correspondingly assigned collector buckets. After the completion of the trip along the high shelf, the order-orientedly filled collector buckets are unloaded into a corresponding number of consignment containers assigned to these orders, which are subsequently further completed in one of the other aisles of the store house or arrive directly at the dispatching station if the order has completely been assembled.

If there are a plurality of consignment containers each on corresponding conveyor tracks on each end of the aisle, the consignment assembler may pick during one trip all the orders for the consignment containers at one end of the aisle and pick all the orders for the consignment containers provided at the other end of the aisle on the return trip etc.

For this reason it is preferably if at the two ends of the aisle at locations facing each other storage stations for the consignment containers are provided, which may be conveyed into opposite directions relative to each other of the aisle.

In accordance with the invention it is preferable to cause the conveyor tracks running along the aisles to discharge into tracks, which are common to them and are guided along the front ends of the high shelves. These convey the empty consignment containers to the aisle and subsequently transfer the filled consignment containers to a packing station, if necessary via further aisles, in which the order in question is completed.

Picking of the articles in question into the collector bucket of the consignment assembler may be automatic or by hand. A corresponding automat has for instance been described in German Auslegeschrift No. 2,601,027. In both cases a check may be provided safeguarding that the picking person in question or the automat, respectively, has picked the correct quantity of articles from the high shelf and put into the corresponding collector buckets. As the computer contains all the data of the orders to be assembled anyway, these informations contained in the computer may be employed for this check as well. In this connection, it is preferable if a weighing device provided on the consignment assembler weighs the weight of the articles of one order assembled in one of the collector buckets (actual weight) and compares it to the weight (nominal weight) of the order to be expected, which nominal weight is to be transmitted from the computer to the weighing device. The weighing device, or the computer, respectively, or a small computer directly connected to the weighing device compares subsequently the actual weight to the nominal weight. If the difference is within predetermined limits, the correct quantity of the article in question has been collected. If the difference is above a predetermined value, either too few or too many articles have been picked into the collector bucket and the error has to be corrected either by returning the excessively picked articles or by picking the missing articles into the collector bucket. This may of course be done by an automat as well.

The novel consignment assembler is characterized in accordance with the invention in that it includes at least one loading and unloading station for the collector buckets, which are controlledly and motor-driven moved along an endless track and pass along this loading and unloading station.

In this connection, the collector buckets are guided by an endless horizontal block chain.

It is moreover preferable if in the area of each loading and unloading station a vertical bar is secured to the consignment assembler, on which a number of optical indicators are provided one above the other. These indicators may show the exact height position of the article to be picked in a given case, the quantity thereof as well as further informations, which are important when collecting the articles.

The invention will now be described in more detail based on an exemplified embodiment, from which further important features may be taken.

FIG. 1 shows schematically a top view on a warehouse having a plurality of high shelves and consignment assemblers and conveyor belts to explain the working principle of the invention, FIG. 2 shows an enlarged schematic top view on the essential constituents of the working station of the consignment assembler employed, and FIG. 3 shows a schematic lateral view of FIG. 2.

To start with, the principle structure of the novel device will be described in connection with FIG. 1. FIG. 1 shows a warehouse comprising a plurality of high shelves 1 between which aisles are provided. Within these aisles, consignment assemblers 4 are arranged movable, preferably on tracks, in the direction of double arrows 3. The consignment assemblers 4 include a height-adjustable movable working station, which is shown in detail in FIGS. 2 and 3. In this way, each coordinate of each high shelf may be reached from the working station of assembler 4, each assembler working in its own aisle.

The arrangement hitherto described is common.

In accordance with the invention, each assembler 4 includes a plurality of collector buckets 5, which may be moved by a motor (not shown) on a horizontal circular track. To this end, the collector buckets 5 are suspended on substantially circular guide rails 8.

The working station shows two loading and unloading positions 6 on opposite sides each directly facing the corresponding high shelf 1.

For unloading the collector buckets 5, the latter may either include a removable bottom or may be turned over as a whole.

At both ends of each aisle, transfer stations 7 and 9 facing each other are provided for the collector buckets as shown in the FIG. 2. The former are fed by conveyor belts 10, on which consignment containers 11 are transported in each aisle in the opposite direction relative to that of the other aisle, as shown by arrows.

The consignment containers 11 are conveyed via a common conveyor belt 13 to the warehouse, are then alternately distributed via a rail to the right or to the left where they are further transported onto conveyor belts 12 in the direction of the arrow until they arrive at one of the aisles 2. They are then charged, by conveyor belts 10 into the corresponding aisles and remain there for the time being in waiting position No. 7 or No. 9.

Assembling of a plurality of consignments is now performed as follows. In the beginning, the corresponding consignment assembler 4 is located at either the right or the left end of aisle 2. In the following, we shall assume that it is located at the right end, i.e. at station 7. A computer 8 has beforehand fed the microprocessor 8' through lead 9 provided on assembler 4 with the programmed data for those consignments, including the specified position of the assembly 4 along the aisle, the height of consignment to be loaded, and the particular collector bucket to be collected, for each order which the corresponding assembler 4 can pick in its aisle 2. The assembler 4 is now moved, together with its working station and loading position 6 to the corresponding storage container on the corresponding high shelf (right or left high shelf of the corresponding aisle). Here, the corresponding quantity of the goods to be taken from the storage container is shown on a register 13 of an illuminated bar 14 having indicia 14', and an automat, or a person, picks the articles from the storage container and puts the articles into a determined one of the collector buckets 5, which, controlled by the computer or the microprocessor, had been moved into the corresponding right or left position 6. The assembler now moves on in the direction towards the left end 9 of the aisle interrupting the trip whenever articles have to be picked from either the right or left high shelf. At the same time, the height of the working station, computer-controlled as well, is correspondingly adjusted. By optimizing the path covered by assembler 4, different collector buckets 5 are filled in this way with the goods assigned to them and in the quantity desired in each individual case. Optimizing denotes in this connection that for assembling a plurality of consignments with the articles to be reached from this aisle, the assembler 4 has to travel only once through the aisle and into only one direction. This is possible because the computer controls the x-y coordinate of the working station as well as the assignement of the corresponding collector bucket to the consignment in question.

When assembler 4 has arrived at station 9 at the left end, the separate filled collector buckets 5 are unloaded into consignment containers 11 correspondingly assigned to them. This means that there are provided at least as many collector buckets as consignment containers 11 may be housed at the end of the aisle. There may however be more collector buckets 5 at the working station.

Controlled by a computer as well through lead 11' connected to a controller of the consignment containers (not shown) the filled consignment containers 11 are transported in the direction of the arrows towards the common conveyor belt 11 and from here to a packing station.

Subsequently, assembler 4 may repeat the operation so that suring the course of one trip from the left station 9 to the right station 7 a further plurality of consignments may be assembled. One working station may house at least ten collector buckets 5 so that at least ten consignments may be assembled on one trip.

Of course it is also possible for assembler 4 to assemble a corresponding number of consignments on one single round trip, in which case one of the stations, 7 or 9, can be omitted.

A weighing devices 16 operatively coupled to a bucket at position 6, by which the total weight of the articles collected for a certain one of the collector buckets 5 is weighed, may for instance be provided in one of positions 6 in FIG. 2. This weighing device is connected to the computer. It weighs the weight of the articles order-orientedly assembled in this collector bucket 5 and compares this actual weight, after deducting the known net weight of the collector bucket 5 to the nominal weight, which was transmitted to it from the computer. This makes possible a check of whether in a given case the correct quantity of articles was filled into the collector bucket 5.

We claim:

1. A method for assembling consignments of articles stored in storage containers on a high shelf by means of a shelf consignment assembler having a working station and a controller for moving the assembler, adjusting the height of the assembly and transferring the buckets to a loading position, comprising the steps of moving said shelf consignment assembler including said working station along the aisle and adjusting the height of said working station depending on the articles to be unloaded or picked in accordance with the control of a computer being programmed with orders, said shelf consignment assembler picking from along said high shelf all the articles of a plurality of orders located on said high shelf while the controller of said assembler simultaneously moves said consignment assembler along said aisle and adjusts the height of said assembler, and transferring one of a plurality of collector buckets at a time to a loading position of said assembler in accordance with an order selectively under control of said computer and filling said collector bucket in accordance with the programmed orders as said articles from said high shelf are emptied, filling a corresponding number of consignment containers at the end of a trip of said assembler in said aisle in accordance with said programmed order.

2. A method according to claim 1, wherein in case of two high shelves separated from each other by an aisle said consignment containers are transported along said aisle from both ends in opposite directions along two conveyor tracks to transfer stations, each conveyor track running along one of said high shelves.

3. A method according to claim 2, wherein said conveyor tracks discharge into tracks, which are common to both of them and are guided along the front ends of said high shelves.

4. A method according to one of claims 1 through 3, wherein a weighing device provided on said consignment assembler weighs the weight of the articles collected into a collector bucket of an order (actual weight) and compares it to the weight to be expected (nominal weight) of the order, which nominal weight is transmitted to it from the computer.

* * * * *